April 8, 1924.
W. M. WHEILDON
DELIVERING MATERIAL FROM ROLLS
Filed July 21, 1919  2 Sheets-Sheet 1
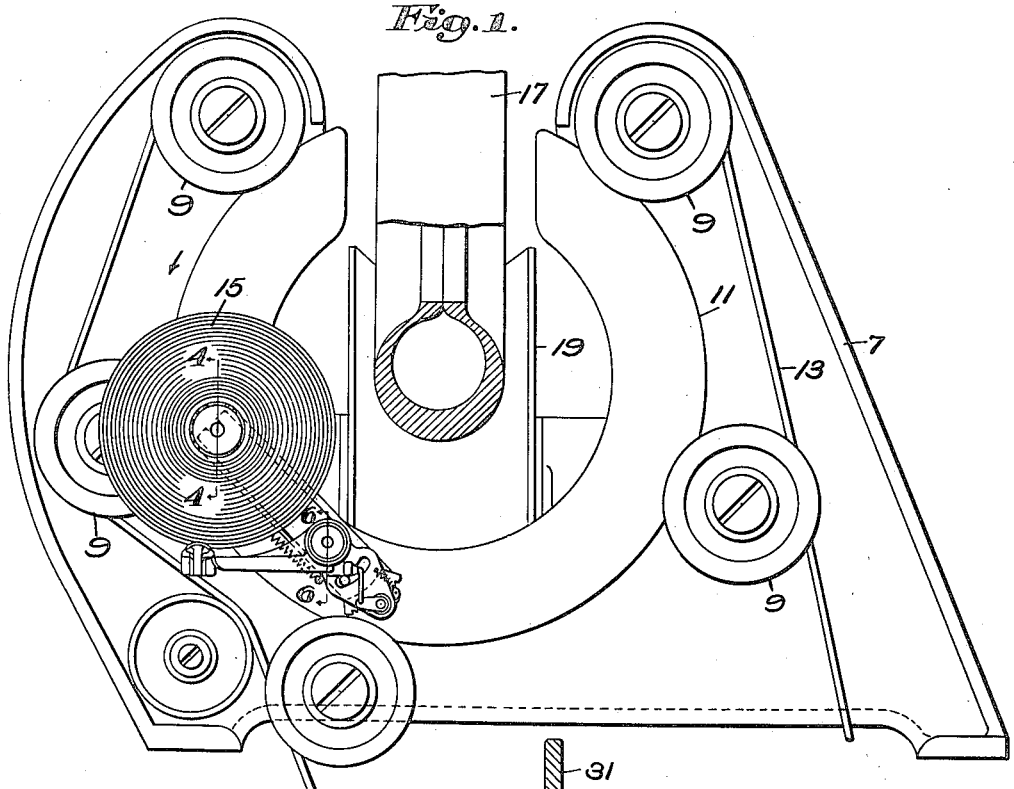
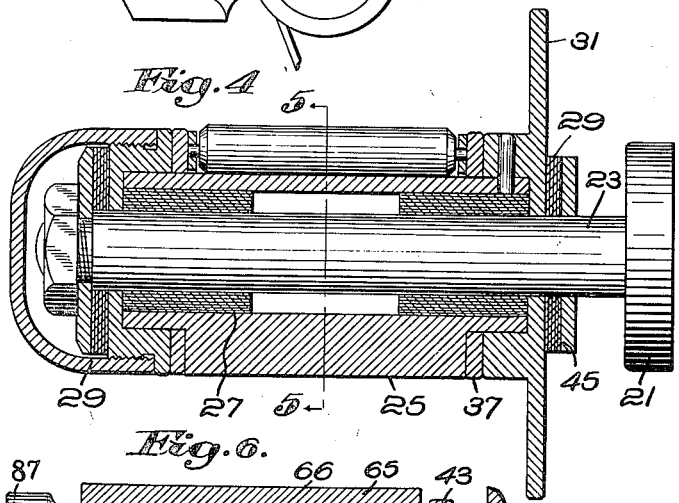
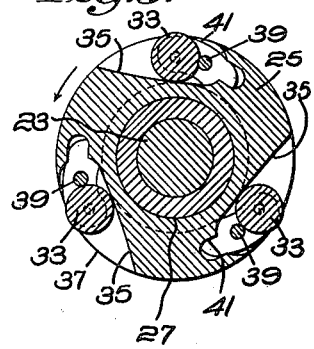
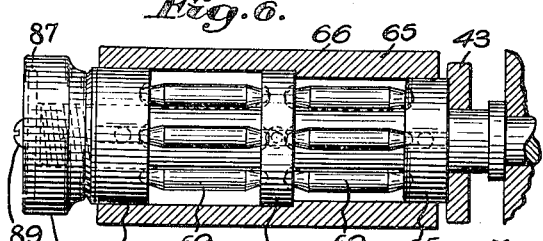
Inventor:
William M. Wheildon
by Emery, Booth, Janney & Varney
Attys.

Patented Apr. 8, 1924.

1,489,874

UNITED STATES PATENT OFFICE.

WILLIAM M. WHEILDON, OF ASHLAND, MASSACHUSETTS, ASSIGNOR TO EDWARD H. ANGIER, OF FRAMINGHAM, MASSACHUSETTS.

DELIVERING MATERIAL FROM ROLLS.

Application filed July 21, 1919. Serial No. 312,368.

*To all whom it may concern:*

Be it known that I, WILLIAM M. WHEILDON, a citizen of the United States, and resident of Ashland, in the county of Middlesex and Commonwealth of Massachusetts, have invented an Improvement in Delivering Material from Rolls, of which the following description, in connection with the accompanying drawings, is a specification, like characters on the drawings representing like parts.

This invention relates to mechanisms for controlling the feed of material from rolls and in particular to a means governing the tension under which the material unwinds. Certain features of the invention in the form herein disclosed adapt it more particularly for use with machines of the type having a revolving head or shuttle on which the roll is carried, so that the roll revolves bodily as well as rotates. An example of machines of this type is a machine designed for use in wrapping tires with a relatively narrow strip of paper and for convenience I have here shown and will describe the invention in connection with such a tire wrapping machine.

My invention will best be understood by reference to the following description of the illustrative embodiment thereof taken in connection with the accompanying drawings wherein:

Figure 1 is a front elevation of a portion of the tire wrapping machine embodying the improvements which form the subject matter of my invention;

Fig. 4 is a section on an enlarged scale through the roll-carrying hub on the line 4—4 of Fig. 1;

Fig. 5 is a section on the line 5—5 of Fig. 4; and

Fig. 6 is a section on the line 6—6 of Fig. 1.

Figure 2:
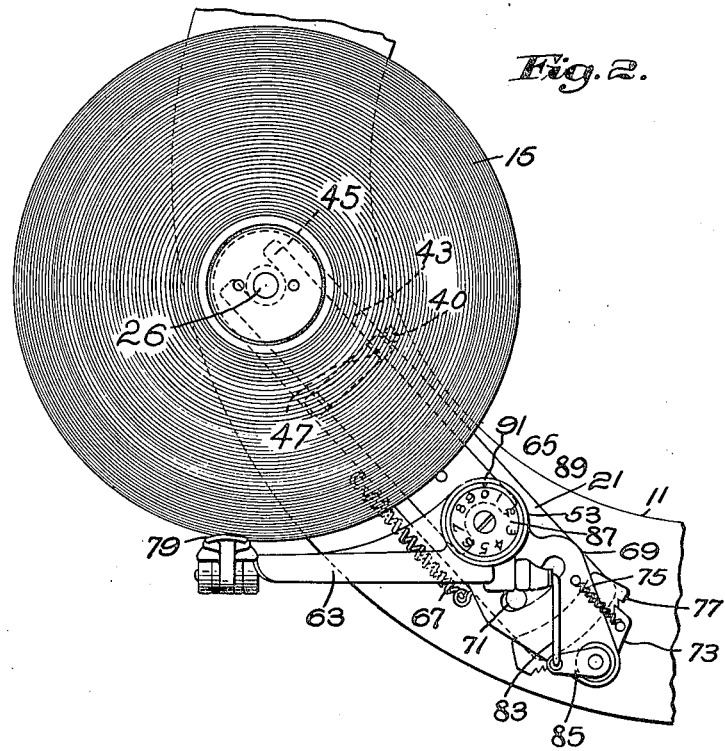
Fig. 2 is an elevation on an enlarged scale of the roll and associated mechanism.

Referring to Fig. 1 of the drawings, I have there shown a portion of a wrapping machine such as may be used to form the package shown in Patent No. 1,282,167, dated Oct. 22, 1918, to Edward H. Angier. Supported on a suitable frame 7 by rollers 9 is a nearly annular shuttle or head 11.
This shuttle is engaged exteriorly by a bight of a driving belt 13 and is revolved about its own axis, carrying with it the roll 15 of wrapping strip. A tire 17 is supported by rolls 19 (only one of which is shown in Fig. 1) so that a portion passes through the eye or opening of the shuttle 11 and it is advanced by the rolls 19. Paper from the strip 15 is drawn off by the rotation of the shuttle and wrapped around the cross section of the tire and the feeding movement of the tire causes the strip to be applied as a helical wrapping.

When making the package described in the patent referred to, it is desirable to apply the wrapping strip under considerable tension to partially expand the resilient gatherings of the wrapping material and form a wrapping tightly drawn about the tire or other article. It will be apparent from inspection of Fig. 1, however, that when the roll of material is large, a much greater torque is exerted than when it is small and consequently a resistance to unwinding of the roll which would adequately tension the material when the roll is new may be unduly large after a considerable amount of the strip has been unwound. The present invention contemplates the provision of suitable means for automatically varying the tension to compensate for the reduction in turning moment as the material is unwound.

Figure 3:
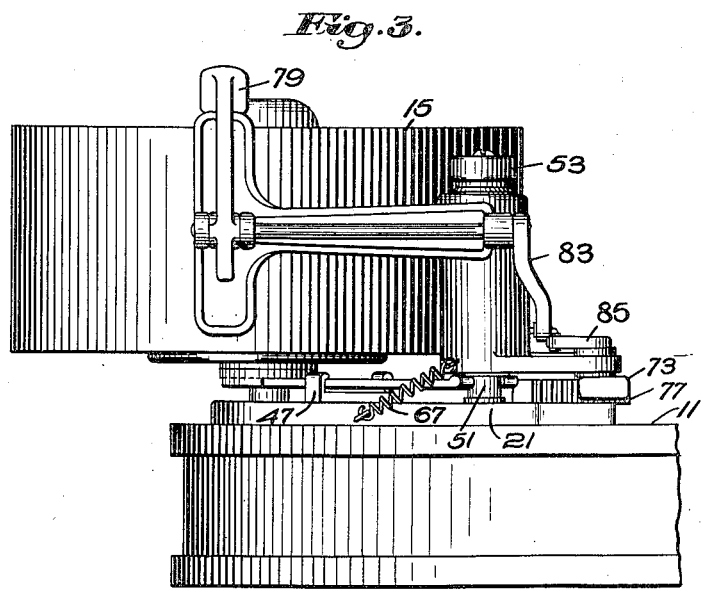
Fig. 3 is a bottom plan of the parts shown in Fig. 2.

Referring more particularly to Figs. 2 and 3, the roll-carrying mechanism and the tensioning means, which takes the form of an adjustable brake restraining the unwinding movement of the strip, is herein organized as a unit carried on a base plate 21 which may be mounted on the shuttle 11. From one end of this plate 21 projects a spindle 23 for supporting the roll, this spindle being best shown in Fig. 4. The roll turns on the spindle 23 through the medium of a sleeve or hub 25 preferably provided with interior bushings 27 of oil-impregnated wood and having end bearings in the form of washers 29 of the same material. The roll of wrapping material, which is usually mounted on a core of cardboard or the like, may be slipped on over this hub from the left viewing Fig. 4 and may rest against the flange portion 31 which is pinned to the inner end of the hub proper and serves to position the roll as regards movement toward the shuttle.

In the present example of my invention, the rotation of the roll is controlled by a suitable braking force applied to this hub and it is desirable to concentrate all the rotating movement on the bearing between the spindle and the hub, and for this purpose the hub is formed to interlock with the core of the roll which is placed thereon and to which the wrapping strip itself may be suitably secured. Herein this is effected by suitable gripping elements which are drawn outwardly to clutch the roll to the hub when draft is applied to the roll in the winding operation. I have shown these gripping elements as taking the form of rollers 33 housed in grooves 35 which extend lengthwise of the hub and are tapered circumferentially thereof. Herein the rollers are supported by a sort of cage comprising washers 37 at opposite ends of the hub connected by rods or trundles 39 (Fig. 5) housed in the grooves. Pivoted to the trundles 39 are arms 41 to which the rollers 33 are journalled, herein by trunnions formed on the latter. By these means the rollers 33 are held in position but the entire cage may move circumferentially and if the core of the roll tends to turn about the hub 25 in a counterclockwise direction viewing Fig. 5, the rollers 33 will be drawn outwardly in the tapering grooves and grip the core of the roll and prevent it from rotating on the hub. The arms 39 and the ends of the hub may be formed with suitable cooperating stop surfaces, as shown at 41 in Fig. 5, to maintain the rollers in contact with the bottoms of the grooves when no core is in position.

By the means thus described the entire rotary movement of the roll as the material is drawn therefrom is concentrated on the bearing of the hub 25 on the spindle 23 and it will be clear that the resistance to unwinding movement may be controlled by a suitable brake applied to the hub. Herein braking force is applied by endwise pressure exerted against the inner washer 29 of oil-impregnated wood and the brake shoe may take the form of a spring-pressed lever 43 which conveniently, as here shown, may be a lever which itself is a spring, the spring as shown in Fig. 2 having a bifurcated end 45 embracing the spindle 23 and bearing on the washer 29, as shown in Fig. 4. The fulcrum of the lever 43 may be conveniently adjustable and I have herein shown a block 47 interposed between the spring 43 and the base plate 21 (see Fig. 3) and adapted to be adjusted along the spring and held in any desired position by a set screw 49. A braking force is exerted on the hub through the spring 43 by pressure exerted on the opposite end of the spring and in the present instance means are provided for governing this pressure in correlation with the feed of the material from the roll. The particular construction of such means which I have here shown by way of example, I shall next describe.

At the opposite end of the spring 43 I have shown a spindle 51 projecting from base plate 21. This spindle may serve as a support for means for applying a thrust against the end of the spring lever, this thrust being conveniently regulated by a nut 53 on the outer end of the spindle. The pressure-applying mechanism herein illustrated is best shown in Fig. 6 and may comprise an inner washer 55 adapted to bear on the end of the spring and an outer washer 57 against which rests nut 53; and between these washers are suitable pressure-applying struts 59. Herein I have shown two sets of these struts forming, as will hereinafter appear, a toggle mechanism, an inner set of struts interposed between the washer 55 and an intermediate washer 61, and an outer set of struts between the intermediate washer 61 and the outer washer 57. There may be three of these pairs of struts 59 disposed at equal intervals around the spindle, as shown in Fig. 6, and they herein take the form of pins having rounded ends resting in suitable recesses in the washers. It will be understood that when the struts 59 are parallel to the axis of the spindle 51, as shown in Fig. 6, they will constitute thrust members by which a pressure applied by setting up the nut 53 may be exerted on the end of the spring bar 43 to apply a suitably regulated braking pressure to the hub. If, however, the intermediate washer 61 be rotated, for instance in a direction toward the observer in Fig. 6, while the end washers 55 and 57 are held in position by the keys securing them to the spindle 51 as shown, the struts will be rocked angularly and occupy a less space from end to end, the action of the double set of struts shown being similar to the breaking of a toggle; and this will permit the end of the spring 43 to move to the left viewing Fig. 6, thus relaxing somewhat the braking pressure on the spring. I herein provide for rotation of the intermediate washer 61 about the spindle 51 by a mechanism governed by the size of the roll. This governing action is herein effected by a suitable feeler arm 63 having a hollow hub 65 receiving the three washers referred to and adapted to turn on the end washers 55 and 57 as bearings. The intermediate washer 61 may turn with the hub about the spindle 51, and I have herein shown this washer as somewhat larger than the others and as inserted in the hub 65 with a driving fit against the shoulder 66 therein (see Fig. 6). The end of the feeler arm is adapted to be positioned by contact with the outer circumference of the roll 15, being drawn toward the same by a suitable spring 67. When the roll is first put on, the struts 59 may be straight, in the position shown in Fig. 6, and any desired tension placed upon the brake spring. As the roll is unwound and the unwinding torque diminishes, the feeler arm 63 will be permitted to swing inwardly in a clockwise direction viewing Fig. 2, rotating the washer 61 and angularly swinging the thrust members. The toggle formed by these strut members will be partially broken and since the outer washer 57 is stationary, the inner washer 55 will be permitted to move outwardly under the influence of the spring and the tension on the spring will be correspondingly relaxed.

In a machine such, for example, as the tire wrapping machine here illustrated, the roll not only rotates but is revolved bodily and the parts are subject to a considerable centrifugal force. I therefore prefer to construct the mechanism as herein disclosed whereby the governing of the braking force is controlled by an application of this centrifugal force. It will be clear from inspection of Fig. 1 that a centrifugal force on the feeler arm 63 tends to lift it away from the roll; and to keep the feeler in constant contact with the roll requires delicate balancing or a relatively strong spring 67 which may cause the feeler arm itself to exert considerable force on the paper. I have therefore herein provided means which permits the feeler to be free of the surface of the roll during operation of the machine but which allows it to drop against the roll when the machine stops. It will be understood that in wrapping tires a considerable number of tires are wrapped from a single roll of material and comparatively few turns of material are drawn off from the roll each time. During the wrapping of a single tire the variation in torque due to this unwinding is not marked and I therefore arrange for a readjustment of the braking tension each time the machine stops, thus providing a step-by-step reduction of the same which sufficiently compensates for the continuous reduction in turning moment on the roll.

To position the feeler arm 63 against centrifugal force and permit it to move inwardly against the surface of the roll under the action of the spring 67 when the machine stops, the hub 65 of the feeler arm may be provided with an arm 69 guided by a pin 71 which projects from base plate 21 and enters a suitable slot in this arm, this arm 65 carrying a pawl 73 drawn by a spring 75 into cooperation with the stationary ratchet rack 77. As will be clear from inspection of Fig. 2, the centrifugal force of the revolving shuttle 11 tends to rock the feeler arm counterclockwise and it is positioned against movement in that direction by the pawl 73. Operation of the machine will draw off a number of turns from the roll 15, leaving the feeler arm spaced from the surface thereof. Then when the machine stops and the arm is no longer under the influence of centrifugal force, the spring 67, which may be a relatively light one, will draw the arm 63 clockwise, which movement is permitted, the pawl 73 moving over the rack 77 and being drawn by the spring 75 into engagement therewith at a point further to the left. This movement of the feeler arm will rock the strut arms 59 and relax the braking tension of the spring 43 in an amount proportional to the reduction in size of the roll 15. This cycle of movements may then be repeated and the braking tension on the hub which carries the roll will be reduced step by step as the roll is unwound.

When the material in the roll has been completely used, the feeler arm will occupy a position closely adjacent to the hub 23 and will be held against outward movement by the pawl 73. I therefore conveniently apply suitable means permitting the disengagement of the pawl 73 from the rack in the operation of placing a new roll in position on the hub. For this purpose a latch 79 (see Figs. 2 and 3) may be pivoted on the under side of the feeler arm where it makes contact with the roll, a portion being presented at the side away from the hub slightly above the level of the contact face of this arm. The latch 79 may operate a rock shaft 81 which through the connecting rod 83 and crank arm 85 is adapted to rock pawl 73 against the force of its spring and out of engagement with the rack. The operation of this mechanism will be easily understood from the following description of the operation of renewing the roll of material.

We may suppose that a roll of material has been in position on the machine and has been entirely used. To remove the core, it is grasped and rotated counterclockwise viewing Figs. 1 and 2, or clockwise viewing Fig. 5, to roll back the rollers 33 into the deep parts of their grooves and release their grip on the core and permit it to be withdrawn axially. The stop surfaces 41 prevent the rollers 33 from falling outwardly and retain them in the position shown in Fig. 5, which permits a new core to be slipped on over the end of the hub from the left hand viewing Fig. 4. The new roll of material is moved toward the hub and is brought downward across the front of the same, the lower edge thereof first engaging the upper face of the latch 79. This latch will be depressed and release the pawl 73, permitting further downward movement of the roll carrying with it feeler arm 63. This downward movement is continued until the core of the roll is opposite the hub, when it is moved inwardly into position against the flange 31. This new movement carries the roll clear of the latch, as shown in Fig.

3, and permits the pawl to be brought into engagement with the rack 77, and the parts are in the position shown in Fig. 2 ready for the operation of the machine in the manner described.

When a full roll is in position, the parts are perferably so arranged that the struts 59 shown in Fig. 6 are straight and a suitable dial, as shown in Fig. 1, may be provided in connection with the nut 53 for indicating the tension placed on the spring by setting up this nut. This tension may also be varied, particularly to compensate for irregularities in the strength of the spring, by adjustment of the fulcrum provided for by the bearing block 47 shown in Fig. 2. The dial herein shown, is a numbered plate 87 (see Fig. 6) housed in a recess in the end of the nut 53 and secured by a screw 89 to the end of the spindle 51. Cooperating with the dial is an indicating mark 91 on the nut. This construction permits adjustment of the zero of the dial by loosening of the screw 89 and angular adjustment of the zero to position it opposite the indicating mark 91 for any desired tension of the spring.

For any given type of work or quality of material, an initial adjustment of braking tension may be effected by unskilled persons by setting up the nut 53 to correspond with a suitable dial indication; and as the unwinding torque on the roll varies the braking tension on the hub will be correspondingly relaxed, herein by a step-by-step reduction.

I have described in detail the specific form of my invention herein illustrated. It will be understood, however, that I have been thus specific in order that the disclosed embodiment might be clearly understood and not because all the details herein shown and described are essential to the principles of my invention. What I consider new and desire to secure by Letters Patent I shall express in the following claims.

Claims:

1. In combination with a suitable support, a spindle carried thereby, a hub rotatable thereon, a spring pressed lever fulcrumed on said support and having an end bearing on said hub, a spindle at the outer end of the lever, inner and outer plates keyed to the spindle, an intermediate plate free to turn thereon, thrust members between said plates and a feeler arm adapted to cooperate with a roll on said hub for rotating said plate.

2. In combination with a suitable support, a spindle carried thereby, a hub rotatable thereon, a spring pressed lever fulcrumed on said support and having an end bearing on said hub, a spindle at the outer end of the lever, inner and outer plates keyed to the spindle, an intermediate plate free to turn thereon, thrust members between said plates, a nut on the spindle cooperating with said outer plate and a feeler arm adapted to cooperate with a roll on said hub for rotating said plate.

3. In combination with a suitable rotary support a spindle projecting therefrom, a hub rotatable on the spindle and over which a roll of material may be placed from the outer end opposite the support, means between said support and hub to exert lengthwise of the spindle a braking pressure on the inner end of the hub, a tensioning device for said means and a feeler adapted to cooperate with a roll on the hub for governing said device.

4. In combination with a suitable rotary support, a spindle projecting therefrom, a hub journalled on the spindle and over which a roll of material may be placed from the outer end opposite the support, a brake lever having an end bearing against the inner end of the hub and means for operating the lever to apply endwise pressure to the hub including a governing feeler arm cooperating with a roll on the hub.

5. Means for controlling the feed of material from a roll comprising a hub to receive the roll, a brake therefor having provision tending resiliently to withdraw it therefrom, and means for operating the brake comprising a feeler arm having a hub and a pressure transmitting strut having one end arranged to turn with that hub and the other relatively fixed.

6. Means for controlling the feed of material from a roll comprising a hub to receive the roll, a brake therefor having provision tending resiliently to withdraw it therefrom, a toggle for tensioning the brake and a feeler cooperating with the roll for moving the toggle.

7. Means for controlling the feed of materials from a roll comprising a hub to receive the roll, a spring lever having one end bearing thereon, rotatably operated means for depressing the opposite end of the lever and a swinging feeler arm cooperating with the roll for operating said means.

8. In combination with a suitable support, a spindle projecting therefrom, a hub rotatable thereon, a spring pressed lever fulcrumed on said support and having an end bearing on the hub, a spindle at the other end of the lever, a plate turning on the spindle, a strut interposed between plate and lever end and a feeler arm cooperating with the roll for rotating said plate.

9. In combination with a suitable support, a spindle projecting therefrom, a hub rotatable thereon, a spring pressed lever fulcrumed on said support and having an end bearing on the hub, a spindle at the other end of the lever, a plate turning on the spindle, a strut interposed between plate and lever end, adjustable means for applying endwise thrust to the strut and a feeler arm cooperating with the roll for rotating said plate.

10. Means for controlling the feed of material from rolls comprising a pivoted feeler arm governed by the size of the roll, a thrust member in the form of a strut having one end movable with said arm and the other relatively fixed, and brake means for the roll tensioned by said member.

11. Means for controlling the feed of material from rolls comprising a hub, a lever for applying a braking force thereto, adjustable means for exerting a pressure on said lever and a feeler governed by the size of the roll for automatically adjusting said means.

12. Means for controlling the feed of material from rolls comprising a brake for the roll, means for applying pressure to the same including relatively fixed and movable abutments and an interposed strut and means governed by the change in size of the roll for shifting the movable abutment.

13. Means for controlling the feed of material from rolls comprising a brake for the roll, means for applying pressure to the same including a rotatable and a non-rotatable abutment and an interposed strut and means for rotating the former governed by the change in size of the roll.

14. Means for controlling the feed of material from rolls comprising a hub, a brake therefor comprising a spring pressed lever, means for applying pressure to the lever including a rotatable member adapted by its rotation to vary the pressure and means governed by change in size of the roll for rotating said member.

15. Means for controlling the feed material from rolls comprising a rotary carrier for the roll, a brake therefor including a spring pressed lever, a spindle at an end of the lever, means organized about said spindle for applying pressure to the lever and comprising a controlling member rotatable thereon and means governed by change in size of the rolls for rotating said member.

16. In a machine having a revolving part which carries a rotating roll, a brake for the roll and means for adjusting the same comprising a feeler arm having means urging it toward the roll and take up means holding it from movement in the other direction.

17. In a machine having a revolving part which carries a rotating roll, a brake for the roll and means for adjusting the same comprising a feeler arm having means urging it toward the roll and a pawl and rack holding it against movement in the other direction.

18. A machine having a revolving part, a support for a rotating roll thereon, resilient means for restraining rotation of the roll, a swinging arm for relaxing said means having an end adapted to be supported by the roll against inward movement and intermittent grip means for holding the arm against outward movement in any inward position.

19. A machine having a revolving part, a support for a rotating roll thereon, resilient means for restraining rotation of the roll, a swinging arm for relaxing said means having an end adapted to be supported by the roll against inward movement, intermittent grip means for holding the arm against outward movement in any inward position and a latch at said end for releasing said grip means.

20. Means for governing the feed of material from rolls comprising a brake, means for applying pressure to the same and intermittently acting means normally idle during feeding movement and automatically effective on each interruption of feed to cause by intermittent readjustments consequent on such interruptions a step by step change of pressure.

21. Means for controlling the feed of material from rolls comprising a feeler arm cooperating with the surface of the roll and subject to be moved therefrom during feeding movement, a brake, means for controlling the pressure of the brake operated by said arm and unidirectional stop means for restraining the outward movement of the arm.

22. In combination a rotating hub and brake means therefor comprising a bar spring having an end bearing thereon, means cooperating with the other end of the spring for tensioning the same and an intermediate adjustable fulcrum for the spring.

23. In combination a rotating hub and brake means therefor comprising a bar spring having an end bearing thereon, means cooperating with the other end of the spring for tensioning the same and a member adjustably shiftable along the spring to provide a bearing therefor.

24. In combination with a suitable support a rotary carrier for a roll a spring pressed lever bearing thereon, means for applying pressure to an end of the lever and a block having means for releasably clamping it to the lever interposed between the same and the support.

25. Means for controlling the feed of material from rolls comprising a hub, a brake therefor including a pressure applying lever, a thrust member for moving the lever and feeler means for angularly swinging said member to vary the thrust.

26. In a machine having a revolving head a device for rotatably supporting a roll of material eccentrically of the head, brake means on the head controlling the rotation of said device and means responsive to centrifugal force due to the revolution of said head acting as the material is drawn from the roll progressively to relax the braking force to compensate for the diminution of the unwinding torque.

27. A machine having a revolving head carrying a rotatable roll, a brake for controlling the rotation of the roll, a feeler arm having an end presented to said roll and by its position controlling the tension of said brake and means for positioning the arm normally restraining its movement under action of centrifugal force thereon while the head revolves but permitting it to lie away from the roll at such time and arranged to permit it to contact with the roll when revolution of the head stops.

28. In combination with a suitable support, a spindle carried thereby, a hub rotatable thereon, a spring pressed lever fulcrumed on said support and having an end bearing on said hub, a spindle at the outer end of the lever, inner and outer plates keyed to the spindle, an intermediate plate free to turn thereon thrust members between said plates, a nut on the spindle cooperating with said outer plate having a recess and an index, a dial in the recess secured to the spindle and cooperating with the index, and a feeler arm adapted to cooperate with a roll on said hub for rotating said plate.

29. In combination with a suitable support, a spindle carried thereby, a hub rotatable thereon, a spring pressed lever fulcrumed on said support and having an end bearing on said hub, a spindle at the outer end of the lever, inner and outer plates keyed to the spindle, an intermediate plate free to turn thereon, thrust members between said plates, a nut on the spindle cooperating with said outer plate a dial carried by the spindle adjacent the nut and a feeler arm adapted to cooperate with a roll on said hub for rotating said plate.

30. A machine of the class described comprising a revolving head, a spindle thereon, a hub journalled on the spindle, having an internal bushing and end washers of oil impregnated wood, resilient means bearing on one of said washers to brake the hub and elements carried by the hub and adapted to be drawn outwardly into gripping engagement with a roll thereon by rotation of the roll.

31. A device of the class described comprising a shaft, a reel rotatably mounted thereon and presenting a surface serving as a friction plate, a cooperating friction member movable longitudinally of the shaft but non-rotatable therewith, means for varying the frictional engagement of the parts controlled by a mechanism including a rotary device adapted by its rotation to exert a force longitudinally of its axis of rotation, and a lever for automatically operating said means.

32. A device of the class described comprising a shaft, a reel rotatably mounted thereon and presenting a surface serving as a friction plate, a pivoted lever presenting to said plate a co-operating friction surface movable longitudinally of said shaft but non-rotatable therewith and means for controlling said pivoted lever including a rotary device adapted by its rotation to exert a force longitudinally of its axis of rotation.

33. A device of the class described comprising a shaft, a reel rotatably mounted thereon and presenting a surface serving as a friction plate, a spring pressed lever adjustably presenting to said plate a cooperating friction surface movable longitudinally of the shaft but non-rotatable therewith and means for moving the lever against the spring resistance comprising a mechanism adapted to convert a rotary motion to a linear motion.

34. A machine of the class described comprising a rotary member, a shaft eccentrically positioned thereon, a reel rotatably mounted on the shaft and presenting a surface serving as a friction plate, a second friction plate 29 slidably mounted on the shaft and adapted to engage the first, a pivoted lever for moving the second plate longitudinally of the shaft and means for controlling said pivoted lever comprising a mechanism adapted to convert rotary motion to a linear motion.

In testimony whereof, I have signed my name to this specification.

WILLIAM M. WHEILDON.